Patented June 21, 1927.

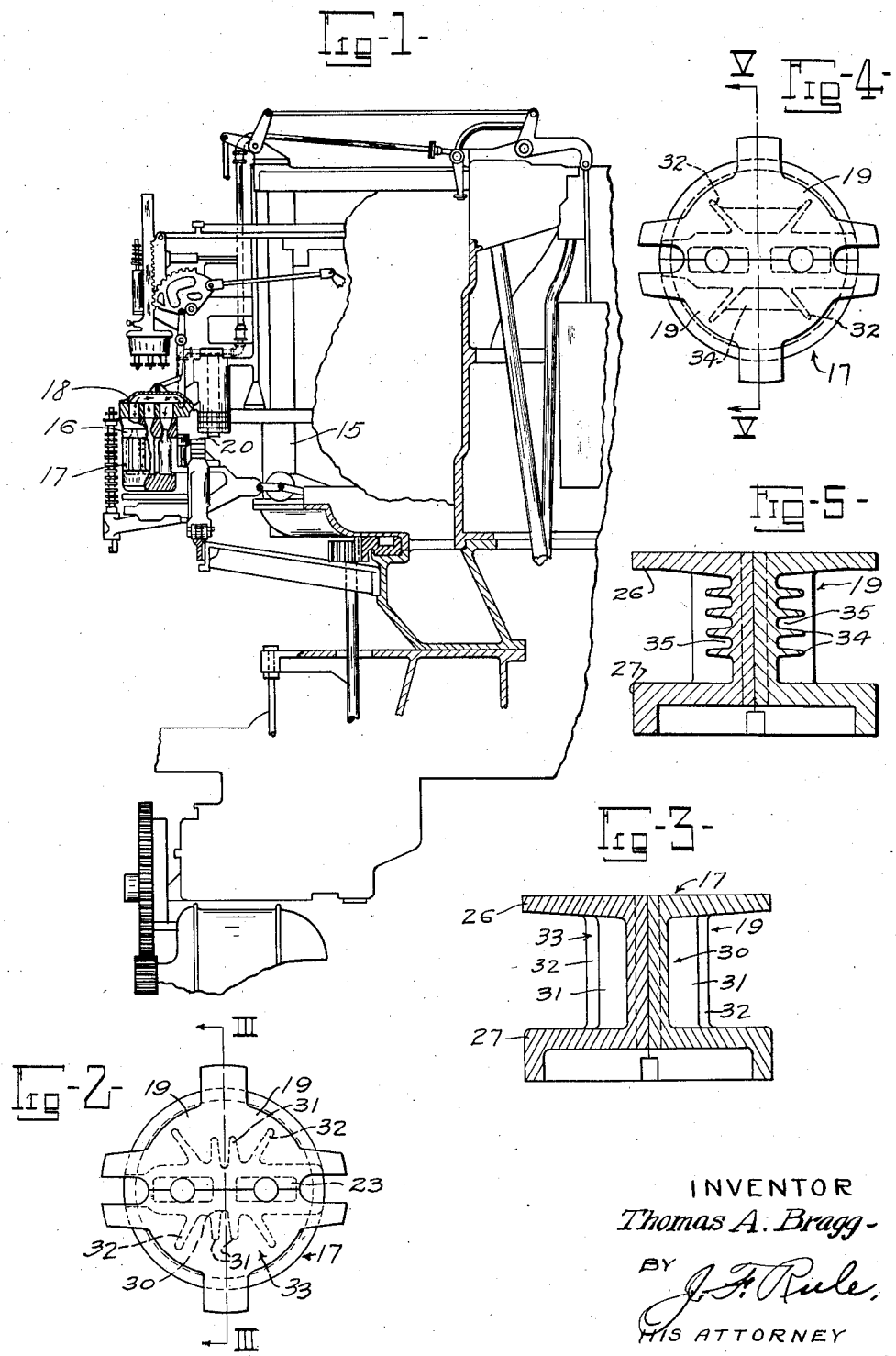

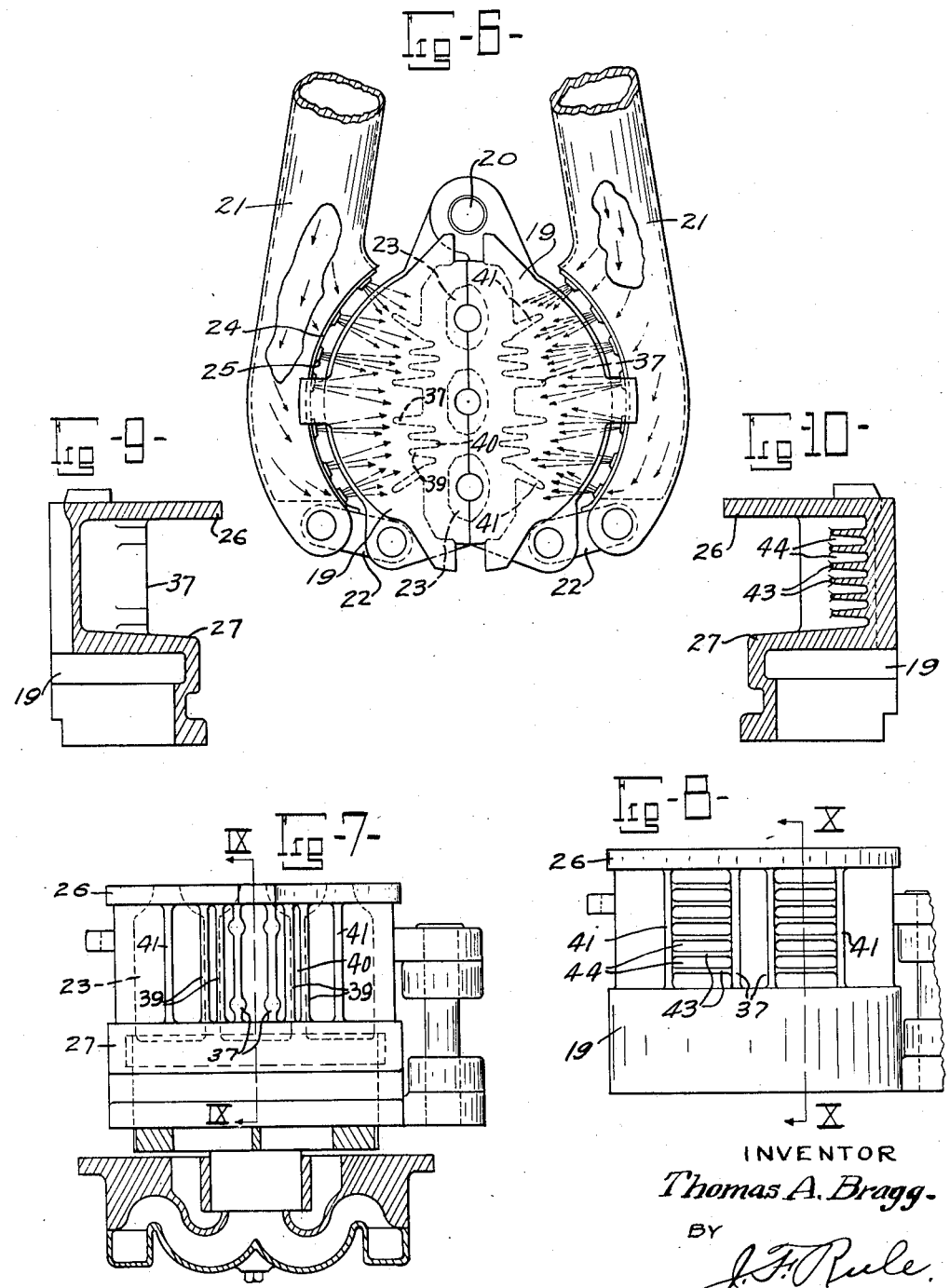

1,632,992

UNITED STATES PATENT OFFICE.

THOMAS A. BRAGG, OF TOLEDO, OHIO, ASSIGNOR TO THE OWENS BOTTLE COMPANY, OF TOLEDO, OHIO, A CORPORATION OF OHIO.

MEANS FOR COOLING MOLDS.

Application filed September 30, 1926. Serial No. 138,593.

The present invention relates to improvements in cooling means for use in connection with the molds of glass forming machines. In the formation of hollow glassware, such as bottles and jars, the molten glass is introduced at a high temperature into molds which are comparatively cold. The heat from the glass is rapidly absorbed by the molds, and in view of the fact that the molds must be kept comparatively cool to prevent the glass from sticking and to cause the necessary chilling of the glass, some means must be supplied to effect the desired cooling.

An object of the present invention is to provide novel and efficient means for rapidly cooling the molds, thereby increasing the output of the machine by permitting it to be operated at a comparatively high speed.

It is also an object to provide means for effectively cooling plural molds in which several mold cavities are formed in each mold section or block, such molds having heretofore been maintained at the proper temperature only with great difficulty.

To this end, the mold body is provided with ribs arranged to cause concentration of blasts of cooling air upon the surfaces between the mold cavities and thereby maintain a lower temperature in these areas than has been obtainable heretofore.

Other objects will be apparent hereinafter.

In the accompanying drawings:

Fig. 1 is a fragmentary view of an Owens type machine with the present invention applied thereto. A full disclosure of this type of machine will be found in Patent 1,185,687, granted June 6, 1916, to Richard La France.

Fig. 2 is a top plan view of a mold showing the rib formation in dotted lines.

Fig. 3 is a sectional view along the line III—III of Fig. 2.

Fig. 4 is a plan view illustrating another arrangement of ribs on the mold sections.

Fig. 5 is a sectional view taken along the line V—V of Fig. 4.

Fig. 6 is a plan view showing a plural mold connected to the operating arms through which cooling air passes, said mold being provided with deflecting ribs as shown in dotted lines.

Fig. 7 is a side elevation of the plural mold shown in Fig. 6.

Fig. 8 is a side elevation of a plural mold showing another arrangement of the ribs.

Fig. 9 is a vertical transverse section taken along the line IX—IX of Fig. 7, showing one section of the mold.

Fig. 10 is a sectional view taken along the line X—X of Fig. 8 and showing one-half of a mold.

Referring to the accompanying drawings, the glass blowing machine comprises a rotating mold carriage 15 which mounts groups of molds, each group including a neck mold 16 and a finishing mold 17. Parisons or blanks which have been formed in the blank mold are suspended from the neck molds 16 after the blank molds open and are then enclosed by the finishing molds 17. While in these finishing molds, the parisons are blown to their final form by air pressure supplied to the finishing mold through blowing heads 18.

Each finishing mold 17 comprises sections or mold halves 19 adapted for movement toward and from each other about a pivot 20. The mold sections 19 are actuated by lever arms 21 whose forward ends are connected by links 22 to the forward ends of the mold sections (see Fig. 6). The mold is provided with a plurality of cavities or openings 23 permitting simultaneous formation of a number of articles in a single mold. The body portion of the mold is of solid formation and ordinarily those portions extending transversely between the mold cavities become excessively heated and retain the heat to such an extent that frequently the glass in the mold cavities is not uniformly chilled prior to opening of the mold. Further, it is often found that excessive heating of a portion of the cavity wall causes the glass to stick to the wall, and results in improper ejection of ware from the forming machine and consequent injury of the ware.

The lever arms 21 are made hollow and cooling air is supplied therethrough and are formed with face plates 24 concentric with the axis of the mold. The plates 24 are provided with vertically disposed slots or nozzles 25 through which cooling air is directed to the sides of the mold body.

Each mold section 19 is provided at the top and bottom with radial flanges 26 and 27. In Figs. 2 and 3, wherein the mold illustrated is provided with a pair of mold cavities 23, the portions lying between the mold cavities are decreased in width, providing transversely aligned vertical channels 30 whose side walls diverge outwardly and merge into the adjacent faces of pairs of ribs 31. These ribs extend from the upper to the lower flange and coact therewith in forming relatively deep elongated pockets or channels 30 whose bottoms terminate at points in proximity to the adjacent walls of the mold cavities. Thus, it is seen that cooling air will be directed to the hottest areas by way of the pockets. To effect further concentration of cooling air upon this area, and thereby maintain uniformity of temperature throughout the mold body, each mold half is formed with additional ribs or fins 32, one spaced from each side of the first named pair. These last named ribs or fins 32 also extend from the upper to the lower flanges and diverge outwardly, thereby providing large substantially funnel shaped pockets 33 in which the first named pairs of ribs are located. Due to the divergence of the outer ribs, cooling air is quite effectively concentrated upon the surfaces lying substantially between the mold cavities, thereby assuring cooling as above indicated.

The form illustrated in Figs. 4 and 5, also contemplates the use of outwardly diverging pairs of ribs or fins 32, the inner edges of which join the mold body at points substantially transversely aligned with the inner adjacent walls of the mold cavities. In this form, there is substituted for the intermediate ribs 31 shown in Figs. 2 and 3, sets of vertically spaced transverse ribs or fins 34 integrally formed with the mold halves and vertical ribs. This rib or fin arrangement provides sets of pockets 35 into which cooling air is directed by means of the outwardly diverging ribs 32 extending vertically between the end flanges of the mold.

In Figs. 6, 7 and 9, the cooling means is illustrated in connection with a mold having three mold cavities 23. In this adaptation of the invention, each half of the mold body is provided with a pair of vertical ribs 37 on its outer face at a point transversely aligned with the central mold cavity, said ribs extending in parallel relation to each other from the end flanges.

Each mold half is also provided on its outer vertical face with relatively deep channels 38 between the mold cavities 23, the side walls of said channels merging into opposed walls of pairs of vertical ribs or fins 39 in substantially the same manner as in the form just set forth. This channel and rib formation provides relatively deep pockets 40 extending a considerable distance into the metal lying between the mold cavities, thereby allowing application of cooling air to these areas with consequent reduction in temperature to a degree substantially corresponding to that of the remaining portion of the mold. Arranged at opposite sides of the set of ribs or fins 39 just referred to, are pairs of ribs 41 which diverge outwardly and are of greater width than the other ribs. These relatively wide ribs, because of their outward divergent relation to each other, provide deflectors causing direct application of unusually large quantities of cooling air to the surfaces lying between said ribs.

In Figs. 8 and 10, there is shown a slight modification in which the vertical ribs 37 of the preceding form have been eliminated and replaced by sets of horizontal or transverse ribs 43 connecting the marginal ribs 41 and the pairs of ribs adjacent the central mold cavity 23. This arrangement of ribs provides a plurality of individual pockets 44 and permits effective concentration of cooling air upon the hottest areas which lie between the mold cavities.

By reducing the transverse thickness of the mold body at the points between the mold cavities and arranging at these points series of ribs so formed that blasts of cooling air are concentrated upon these particular areas, the temperature of the entire mold body may be maintained uniformly throughout, thereby preventing sticking of the glass to the mold cavity walls and deformation of ware in the cavities due to overheating. Also, the provision of the ribs or fins at the points adjacent the opposed walls of the mold cavities greatly enlarges the surface exposed to the atmosphere, with the result that effectiveness of the cooling air applied to the mold is materially increased.

Manifestly, certain changes may be resorted to within the spirit and scope of the appended claims.

What I claim is:

1. A mold having a plurality of mold cavities, flanges extending radially from the upper and lower ends of the mold, and pairs of ribs extending longitudinally of the mold intermediate the mold cavities.

2. A mold having a plurality of mold cavities, flanges extending radially from the upper and lower ends of the mold, and pairs of outwardly divergent ribs arranged on the mold surface intermediate the mold cavities, said ribs and flanges coacting to form pockets into which cooling air is directed.

3. The combination of a mold having a plurality of mold cavities, means for directing cooling air against the outer surfaces of the mold, and means on the mold for causing application of a major portion of the cooling air to areas lying between the mold cavities.

4. The combination of a mold having a plurality of mold cavities, means for directing cooling air against the outer surfaces of the mold, and a plurality of pockets formed in the mold between the mold cavities to cause concentration of cooling air upon the areas intermediate said cavities.

5. A mold having a plurality of mold cavities, pairs of ribs diverging outwardly from points between the cavities at opposite sides of the mold, and means interconnecting the ribs to form pockets in the side walls of the mold.

6. A mold having a plurality of mold cavities, and formed with longitudinal channels in its outer face between said cavities, and ribs arranged along and extending outwardly from the sides of the channels.

7. The combination of a mold having a plurality of mold cavities, means for directing cooling air against the outer surfaces of the mold, and pairs of ribs diverging outwardly from the sides of the mold intermediate the cavities to cause a maximum concentration of cooling air upon said intermediate portions.

8. A mold having a plurality of mold cavities, pairs of ribs spaced from each other and extending outwardly from opposite sides of the mold at points between said cavities, means interconnecting corresponding ends of said ribs forming main pockets, and aditional relatively small ribs arranged between said pair of ribs.

9. A mold having a plurality of mold cavities, radial flanges on the upper and lower ends of said mold, means for supplying air to the sides of the mold, and means causing concentration of the air upon the mold surfaces at points between the cavities.

10. A mold having a plurality of mold cavities, radial flanges on the upper and lower ends of said mold, means for supplying cooling air to the sides of the mold, and sets of ribs arranged to concentrate the cooling air upon surfaces of the mold between the cavities.

11. A mold having a plurality of mold cavities, radial flanges on the upper and lower ends of said mold, means for supplying cooling air to the sides of the mold, and sets of ribs arranged between the cavities and diverging outwardly to form substantially funnel shaped pockets into which the cooling air is directed.

12. A mold having a plurality of mold cavities and vertical channels formed in the surface intermediate the cavities, radial flanges at the upper and lower ends of the mold, ribs extending outwardly from the opposite sides of the channels, and sets of transverse ribs connecting the other ribs and forming pockets substantially between the cavities.

13. A mold having a plurality of mold cavities, radial flanges at the upper and lower ends of the mold, sets of ribs formed on the mold surface between the cavities, said ribs arranged to provide a series of pockets in the spaces between the mold cavities.

Signed at Toledo, in the county of Lucas and State of Ohio, this 28th day of September, 1926.

THOMAS A. BRAGG.